US008769061B2

(12) United States Patent
Lancaster et al.

(10) Patent No.: US 8,769,061 B2
(45) Date of Patent: *Jul. 1, 2014

(54) SYSTEM AND METHOD OF CONFIGURING A NETWORK

(75) Inventors: Arthur L. Lancaster, Austin, TX (US); Melissa G. Simpler, Austin, TX (US); Todd M. Greer, Austin, TX (US)

(73) Assignee: Affinegy, Inc., Austin, TX (US)

( * ) Notice: Subject to any disclaimer, the term of this patent is extended or adjusted under 35 U.S.C. 154(b) by 174 days.

This patent is subject to a terminal disclaimer.

(21) Appl. No.: 13/278,509

(22) Filed: Oct. 21, 2011

(65) Prior Publication Data

US 2012/0036240 A1 Feb. 9, 2012

Related U.S. Application Data

(63) Continuation of application No. 11/932,851, filed on Oct. 31, 2007, now Pat. No. 8,069,230.

(51) Int. Cl.
*G06F 15/177* (2006.01)
*H04L 12/24* (2006.01)

(52) U.S. Cl.
CPC ................... *H04L 41/0813* (2013.01)
USPC ...................................................... 709/221

(58) Field of Classification Search
CPC ................................. H04L 41/0813
USPC ................................. 709/220–222
See application file for complete search history.

(56) References Cited

U.S. PATENT DOCUMENTS

| 7,006,506 | B1* | 2/2006 | Naik | 370/397 |
|---|---|---|---|---|
| 7,284,268 | B2 | 10/2007 | Schmidt et al. | |
| 7,287,280 | B2* | 10/2007 | Young | 726/25 |
| 7,293,077 | B1* | 11/2007 | Teo et al. | 709/221 |
| 7,366,187 | B2* | 4/2008 | McCabe | 370/401 |
| 7,398,305 | B2* | 7/2008 | Bodin et al. | 709/222 |
| 7,451,222 | B2* | 11/2008 | Sullivan | 709/227 |
| 7,500,158 | B1* | 3/2009 | Smith et al. | 714/708 |
| 7,594,259 | B1* | 9/2009 | Audet et al. | 726/11 |
| 7,631,181 | B2* | 12/2009 | Hirata et al. | 713/151 |
| 7,755,480 | B2* | 7/2010 | Aritsuka et al. | 340/539.22 |
| 7,804,807 | B2* | 9/2010 | Korus et al. | 370/338 |
| 7,908,660 | B2* | 3/2011 | Bahl | 726/25 |
| 8,041,785 | B2* | 10/2011 | Mazur et al. | 709/220 |
| 8,069,230 | B2* | 11/2011 | Lancaster et al. | 709/221 |
| 8,079,073 | B2* | 12/2011 | Roberts | 726/11 |
| 8,126,991 | B2* | 2/2012 | Smith et al. | 709/222 |

(Continued)

OTHER PUBLICATIONS

Non-Final Office Action for U.S. Appl. No. 11/932,851 received from the United States Patent and Trademark Office (USPTO), dated Sep. 14, 2009, 12 pages.

(Continued)

*Primary Examiner* — Jerry Dennison
(74) *Attorney, Agent, or Firm* — Toler Law Group, PC

(57) ABSTRACT

Methods and systems for configuring a network are described. A method may include detecting, during installation of a software program on a computing device, a router coupled to the computing device. The software program may be executable by a processor to selectively initiate a connection to a network via the router based on a security level of the router The method may also include modifying the security level of the router to satisfy a threshold security level. The threshold security level may be specified by a service provider of the network.

20 Claims, 4 Drawing Sheets

(56) References Cited

U.S. PATENT DOCUMENTS

| | | | |
|---|---|---|---|
| 2003/0105389 A1* | 6/2003 | Noonan et al. | 600/300 |
| 2003/0172145 A1* | 9/2003 | Nguyen | 709/223 |
| 2003/0204748 A1* | 10/2003 | Chiu | 713/201 |
| 2003/0212773 A1* | 11/2003 | Sullivan | 709/221 |
| 2004/0133689 A1* | 7/2004 | Vasisht | 709/228 |
| 2004/0187034 A1* | 9/2004 | Tamura et al. | 713/201 |
| 2004/0203590 A1* | 10/2004 | Shteyn | 455/410 |
| 2004/0208195 A1* | 10/2004 | Kim et al. | 370/463 |
| 2005/0066197 A1* | 3/2005 | Hirata et al. | 713/201 |
| 2005/0160287 A1 | 7/2005 | Mehta et al. | |
| 2005/0176420 A1 | 8/2005 | Graves et al. | |
| 2005/0177647 A1 | 8/2005 | Anantha et al. | |
| 2005/0267928 A1* | 12/2005 | Anderson et al. | 709/200 |
| 2006/0062391 A1* | 3/2006 | Lee et al. | 380/270 |
| 2006/0098627 A1* | 5/2006 | Karaoguz et al. | 370/352 |
| 2006/0143439 A1* | 6/2006 | Arumugam et al. | 713/153 |
| 2006/0187912 A1* | 8/2006 | Schwartz et al. | 370/389 |
| 2006/0212570 A1* | 9/2006 | Aritsuka et al. | 709/224 |
| 2006/0251254 A1* | 11/2006 | Peng et al. | 380/270 |
| 2007/0019670 A1* | 1/2007 | Falardeau | 370/465 |
| 2007/0140128 A1* | 6/2007 | Klinker et al. | 370/238 |
| 2007/0143851 A1* | 6/2007 | Nicodemus et al. | 726/25 |
| 2007/0146782 A1* | 6/2007 | Lehotsky et al. | 358/1.15 |
| 2007/0180491 A1* | 8/2007 | Mevissen et al. | 726/2 |
| 2007/0214226 A1* | 9/2007 | Song et al. | 709/206 |
| 2007/0261111 A1* | 11/2007 | Roberts | 726/11 |
| 2008/0019367 A1* | 1/2008 | Ito et al. | 370/392 |
| 2008/0052348 A1* | 2/2008 | Adler et al. | 709/203 |
| 2008/0117920 A1* | 5/2008 | Tucker | 370/401 |
| 2008/0126799 A1* | 5/2008 | Winig | 713/166 |
| 2008/0172477 A1* | 7/2008 | Mazur et al. | 709/220 |
| 2008/0189788 A1* | 8/2008 | Bahl | 726/25 |
| 2008/0201705 A1* | 8/2008 | Wookey | 717/175 |
| 2008/0295144 A1* | 11/2008 | Cam-Winget et al. | 726/1 |
| 2008/0320114 A1* | 12/2008 | Bodin et al. | 709/220 |
| 2009/0019141 A1* | 1/2009 | Bush et al. | 709/223 |
| 2009/0063667 A1* | 3/2009 | Smith et al. | 709/222 |
| 2009/0113044 A1* | 4/2009 | Lancaster et al. | 709/224 |
| 2009/0323555 A1* | 12/2009 | Lancaster et al. | 370/254 |
| 2009/0327440 A1* | 12/2009 | Lancaster et al. | 709/206 |
| 2011/0125925 A1* | 5/2011 | Bouthemy et al. | 709/250 |
| 2012/0124138 A1* | 5/2012 | Smith et al. | 709/204 |

OTHER PUBLICATIONS

Final Office Action for U.S. Appl. No. 11/932,851 received from the United States Patent and Trademark Office (USPTO), dated Mar. 30, 2010, 9 pages.

Non-Final Action for U.S. Appl. No. 11/932,581 received from the United States Patent and Trademark Office (USPTO), dated Oct. 1, 2010, 11 pages.

Notice of Allowance and Fees Due for U.S. Appl. No. 11/932,851 received from the United States Patent and Trademark Office (USPTO), dated Mar. 18, 2011, 9 pages.

Notice of Allowance and Fees Due for U.S. Appl. No. 11/932,851 received from the United States Patent and Trademark Office (USPTO), dated Jul. 21, 2011, 9 pages.

* cited by examiner

SYSTEM AND METHOD OF CONFIGURING A NETWORK

CLAIM OF PRIORITY

The present application claims priority from and is a continuation of patent application Ser. No. 11/932,851 filed on Oct. 31, 2007 and entitled "SYSTEM AND METHOD OF CONFIGURING A NETWORK," the contents of which are expressly incorporated herein by reference in their entirety

FIELD OF THE DISCLOSURE

The present disclosure is generally related to networks and to configuring a network.

BACKGROUND

Computers increasingly are being used to connect to a network. Particularly, computers are frequently used in conjunction with wireless home networks to access a public network, such as the Internet. However, a user may not be aware when the connection to the public network has changed. In addition, the user may not be aware that the network may need to be configured. Further, some users find it difficult to configure the network themselves, which can result in costly support calls to an interne service provider or a manufacturer of network component.

DETAILED DESCRIPTION OF THE DRAWINGS

Figure 1:
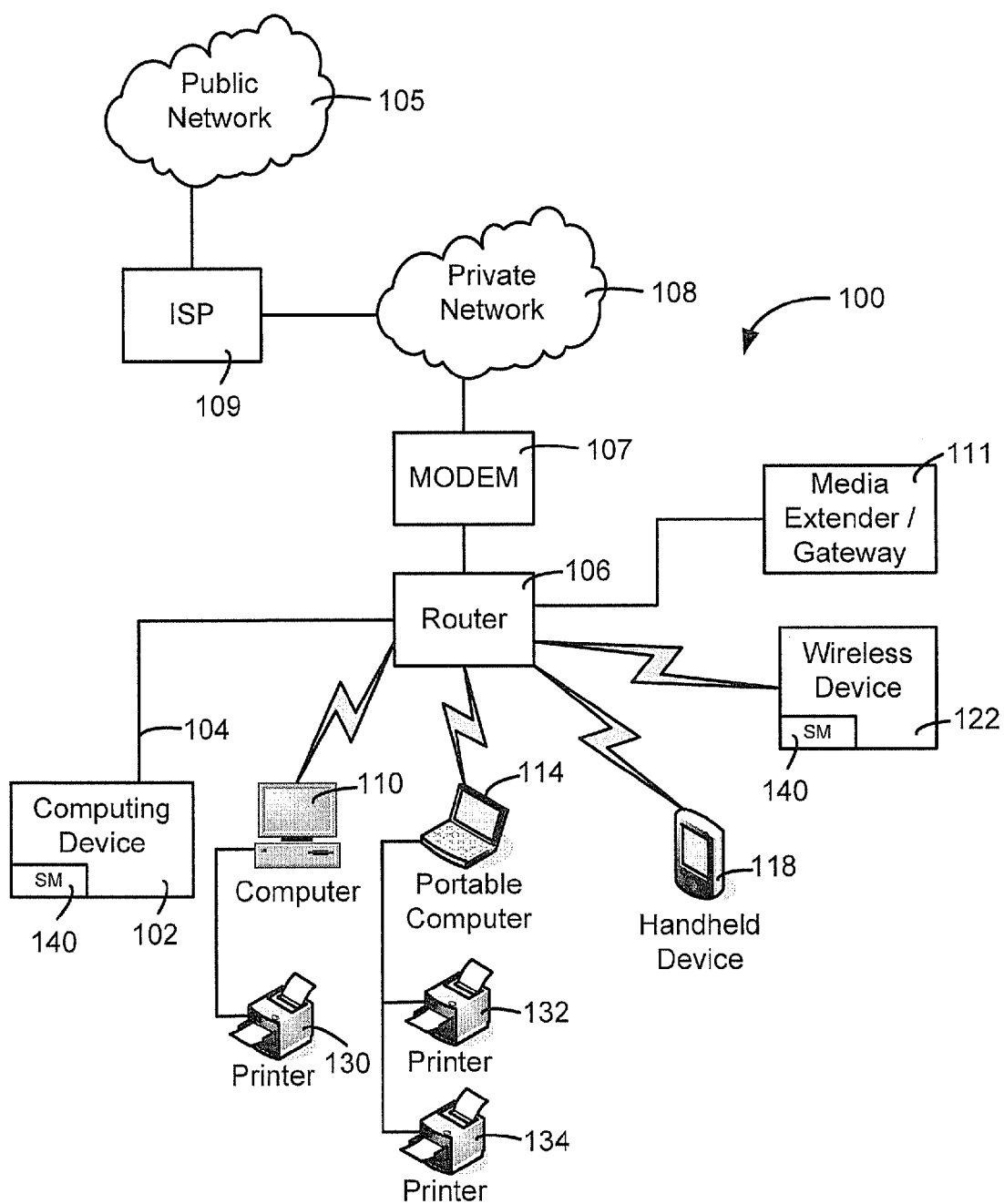
FIG. 1 is a block diagram of an embodiment of a network and a system to configure the network.

In a particular embodiment, a method may include detecting, during installation of a software program on a computing device, a router coupled to the computing device. The software program may be executable by a processor to selectively initiate a connection to a network via the router based on a security level of the router. The method may also include modifying the security level of the router to satisfy a threshold security level. The threshold security level may be specified by a service provider of the network.

A non-transitory computer-readable storage medium includes instructions executable by a processor. In a particular embodiment, the instructions are executable by the processor to detect, during installation of a software program on a computing device, a router coupled to the computing device. The software program may be executable by the computing device to selectively initiate a connection to a network via the router based on a security level of the router. The instructions may further be executable by the processor to detect whether a security level of the router satisfies a threshold security level. The threshold security level may be specified by a service provider of the network. The instructions may be further executable by the processor to modify the security level of the router to satisfy the threshold security level in response to the security level of the router not satisfying the threshold security level.

In another particular embodiment, a system may include a transceiver, a processor coupled to the transceiver, and a memory accessible to the processor. The memory includes instructions executable by the processor to detect, during installation of a software program on a computing device, a router coupled to the computing device. The software program may be configured for execution by the processor to selectively initiate a connection to a network via the router based on a security level of the router. The memory further includes instructions executable by the processor to modify the security level of the router to satisfy a threshold security level. The threshold security level may be specified by a service provider of the network.

In a particular embodiment, a method may include monitoring properties of a connection between a computing device and a network. The method may also include detecting a change in the properties of the connection. The method may also include verifying the connection to the network is provided by a service provider when the change in the properties is detected and providing network configuration options based on the change.

In another particular embodiment, a method operable by a processor in a computing device may include installing a software program on the computing device. The software program to provide access to a network. The method may also include detecting, during installation of the software program, a router coupled to the computing device. The method may also include detecting data to indicate that the router is to be configured and providing configuration options for the router.

In another particular embodiment, a system may include a transceiver, a processor coupled to the transceiver, and a memory accessible to the processor. The memory includes instructions executable by the processor to monitor properties of a connection between the transceiver and a network in real-time. The memory further includes instructions executable by the processor to detect a change in the properties of the connection. The memory further includes instructions executable by the processor to verify that the connection to the network is provided by a specific service provider when the change in the properties is detected and to provide network configuration options.

In yet another particular embodiment, a computer-readable medium is provided having instructions for causing a processor to execute a method. The method may include installing a software program on a computing device, the software program to provide access to a network. The method may also include detecting, during installation of the software program, a router coupled to the computing device. The method may further include detecting data to indicate that the router is to be configured.

Referring to FIG. 1, a network is illustrated and generally designated 100. The network 100 includes a computing device 102 coupled to a router 106 via a wire connection 104. In a particular embodiment, the router 106 may be a wireless router able to wirelessly communicate with a computer 110, a portable computer 114, a handheld device 118, such as cell phone or personal digital assistant (PDA), or any other wireless device 122. The computer 110 may be coupled to a printer 130. The portable computer 114 may be coupled to a printer 132 and a printer 134. In a particular embodiment, the network may be a local area network (LAN). In another particular embodiment, the LAN may be at a location, such as an office or residence, of a subscriber to a service provider.

The router 106 may be coupled to a modem 107 that can communicate with a service provider 109, such as an internet service provider (ISP), over a private network 108. The router 106 and the modem 107 may be located in a single device. The service provider 109 may be coupled to a public network 105, such as an internet protocol (IP) network. The service provider 109 may assign a public internet protocol address to the modem 107. The router 106 may have a private IP address to allow the computing device 102, the wireless device 122, the computer 110, the portable computer 114, and the handheld device 118 to share a connection between the modem 107 and the service provider 109.

In a particular embodiment, the router 106 may be coupled to a media extender 111. The media extender 111 may allow media center capabilities to be centralized. For example, the media extender 111 may allow sharing of media files between all of the devices on the network. The media extender 111 may also be a media gateway or a digital media receiver. The media extender 111 may retrieve media files (music, pictures, video, etc.) by browsing file trees and using metadata to organize media files. In addition, the media extender 111 may connect wirelessly or through a wired connection to other devices, such as computing device 102, the wireless device 122, the computer 110, the portable computer 114, and the handheld device 118. In another particular embodiment, the media extender 111 and the router 106 may be located in a single device.

A software module 140 may be implemented on the computing device 102, the wireless device 122, the computer 110, the portable computer 114, the handheld device 118, the media extender 111, or any combination thereof. In a particular embodiment, the software module 140 may be a module of a service provider installation software. In another particular embodiment, the software module 140 may be a stand-alone software module, which may be installed on the computing device 102 from a compact disc (CD), a downloadable file, or any other installation means.

During operation, the software module 140 may monitor when the router's 106 configuration has changed or when a router is added to the network 100. In a particular embodiment, the software module 140 may automatically detect when the router's 106 configuration has changed or when a router has been added to the network 100. The software module 140 may notify a user of the computing device 102 that a new router or a router configuration change was detected. The software module 140 may query a user if they would like assistance configuring the router. When the software module 140 receives an indication that the user would like help configuring the connection, the software module 140 may provide selectable configuration options to the user via the computing device 102.

The configuration options may include selectable options to configure settings of the router 106. The configuration options may also include selectable options to repair any problems with the connection to the service provider 109. The configuration options may also include selectable options to implement features such as security, file-sharing, or print sharing. For example, the security features may include encryption, a password protection, a firewall, or any combination thereof In another example, the print sharing features may allow the printers 130, 132, and 134 to be configured for shared printing via the router 106.

In a particular embodiment, the configuration options may include configuring a network address translation (NAT) setting, such as enabling or disabling a NAT feature. The configuration options may also includes configuring a stateful packet inspection (SPI) firewall. The configuration options may allow the SPI firewall to be enabled or disabled. The configuration operations may also allow settings of the SPI firewall to be modified.

Figure 2:
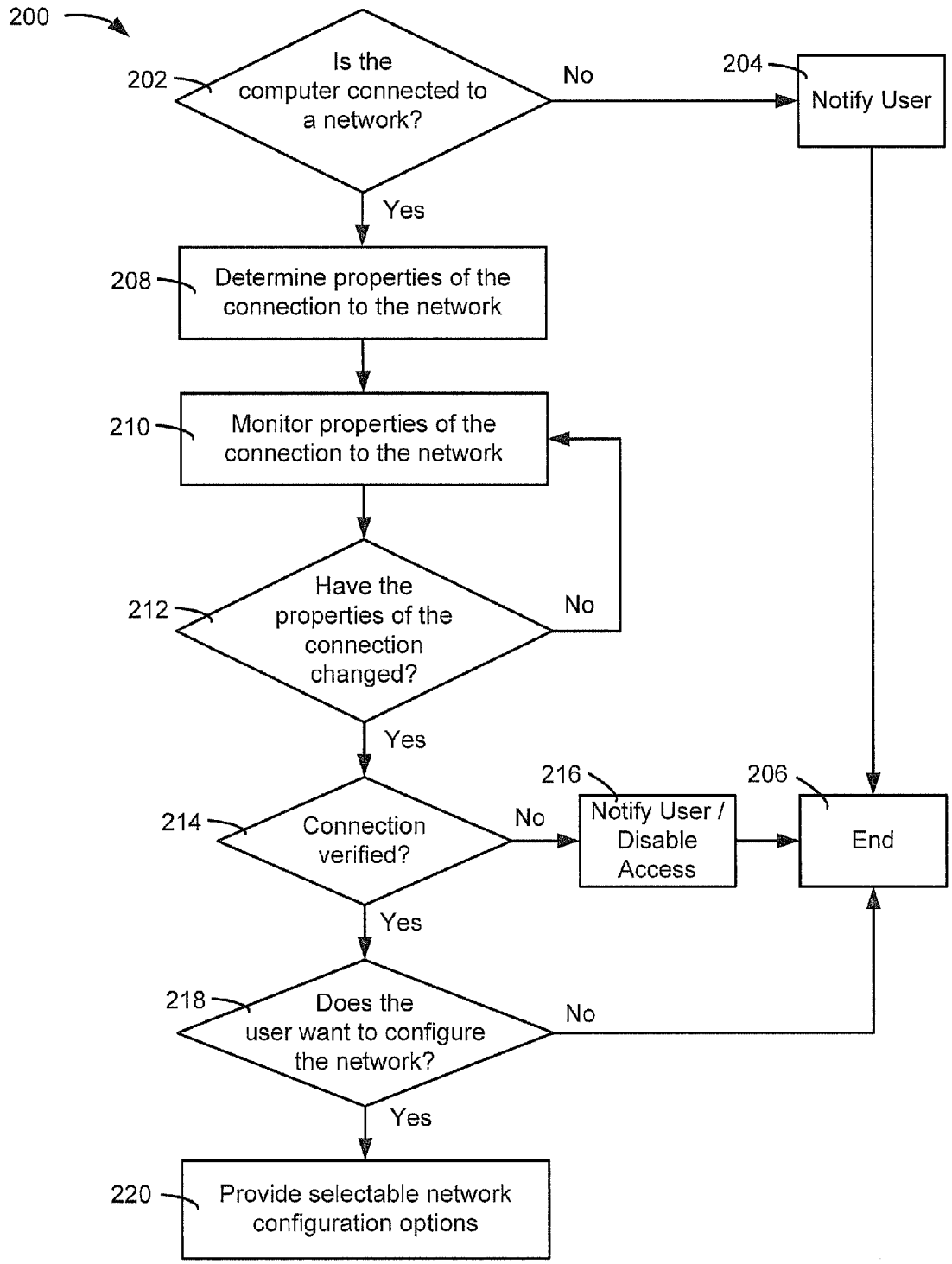
FIG. 2 is a flow chart of a first illustrative embodiment of a method of configuring a network.

Referring to FIG. 2, a flow chart of a first illustrative embodiment of a method of configuring a network is depicted and generally designated 200. The method 200 can be executed via a software module at a computer capable of connecting to the network, such as the computing device 102, the computer 110, the portable computer 114, the handheld device 118, or the wireless device 122 shown in FIG. 1.

The method 200 includes determining if the computer is connected to a network, at 202. In a particular embodiment, the network may be a public network, such as the public network 105 shown in FIG. 1. The connection may be detected by determining an IP address assigned to a modem or router, such as the modem 107 or router 106 shown in FIG. 1. The connection may also be detected by a trace route or a ping. When the computer is not connected to the network, the method 200 may include notifying a user that the computer is not connected to the network, at 204, and then the method 200 may end, at 206.

When the computer is connected to the network, the method 200 can determine properties of the connection to the network, at 208. In a particular embodiment, the properties of the connection may include an IP address. The method 200 may also include monitoring the properties of the connection to the network, at 210.

The method 200 may also include determining if the properties of the connection to the network have changed, at 212. When the properties have not changed, the method 200 may continue to monitor the properties of the connection, at 210. Thus, the method 200 may detect a change in the properties in real-time. In a particular embodiment, a change in the properties may be detected when a public IP address is switched to a private IP address. For example, adding a router to the network may switch a public IP address for the computer to a private IP address. In a particular embodiment, detecting a change in the connection may be done automatically by the computer, that is without the detection being initiated by a user.

In a particular embodiment, when the properties have changed, the method 200 may include verifying the connection, at 214. The verifying may include determining if the connection to the public network is still accessible through the service provider.

The connection may be verified by multiple techniques. A first technique may include comparing a subnet address of a new IP address to a subnet address of a previously known IP address. This can determine if the network is still connected to the same service provider when the subnet range from the service provider. A second technique may include using a trace route that shows a list of routers traversed, to allow the user to identify the path taken to reach a particular destination on the network. A third technique may include pinging the service provider by sending a packet to a specified address and waiting for a reply. A fourth technique may include pinging the router by sending a packet to a specified address and waiting for a reply.

When the connection cannot be verified, the method 200 may notify the user that the connection could not be verified, at 216, and then end, at 206. In another embodiment, the method 200 may disable access to the connection when the connection can not be verified.

When the connection can be verified, the method 200 may determine if the user wants to configure the network, at 218. In a particular embodiment, a message may be presented to the user to determine if the user want to configure the network. In another embodiment, a setting of the computer or a setting of the software implementing the method 200 may indicate if the user wants to configure the network. For example, the computer or the software may have an option to automatically configure the network when the properties have changed.

When the user does not want to configure the network, the method 200 may end, at 206. When the user does want to configure the network, the method 200 may provide selectable network configuration options, at 220. The configuration options may be presented to a user via a graphical user interface.

The configuration options may include selectable options to configure settings of the router. The configuration options may also include selectable options to repair any problems with the connection. The configuration options may also include selectable options to implement features such as security, file-sharing, and print sharing. The security features may include encryption, a password protection, a firewall, or any combination thereof.

Figure 3:
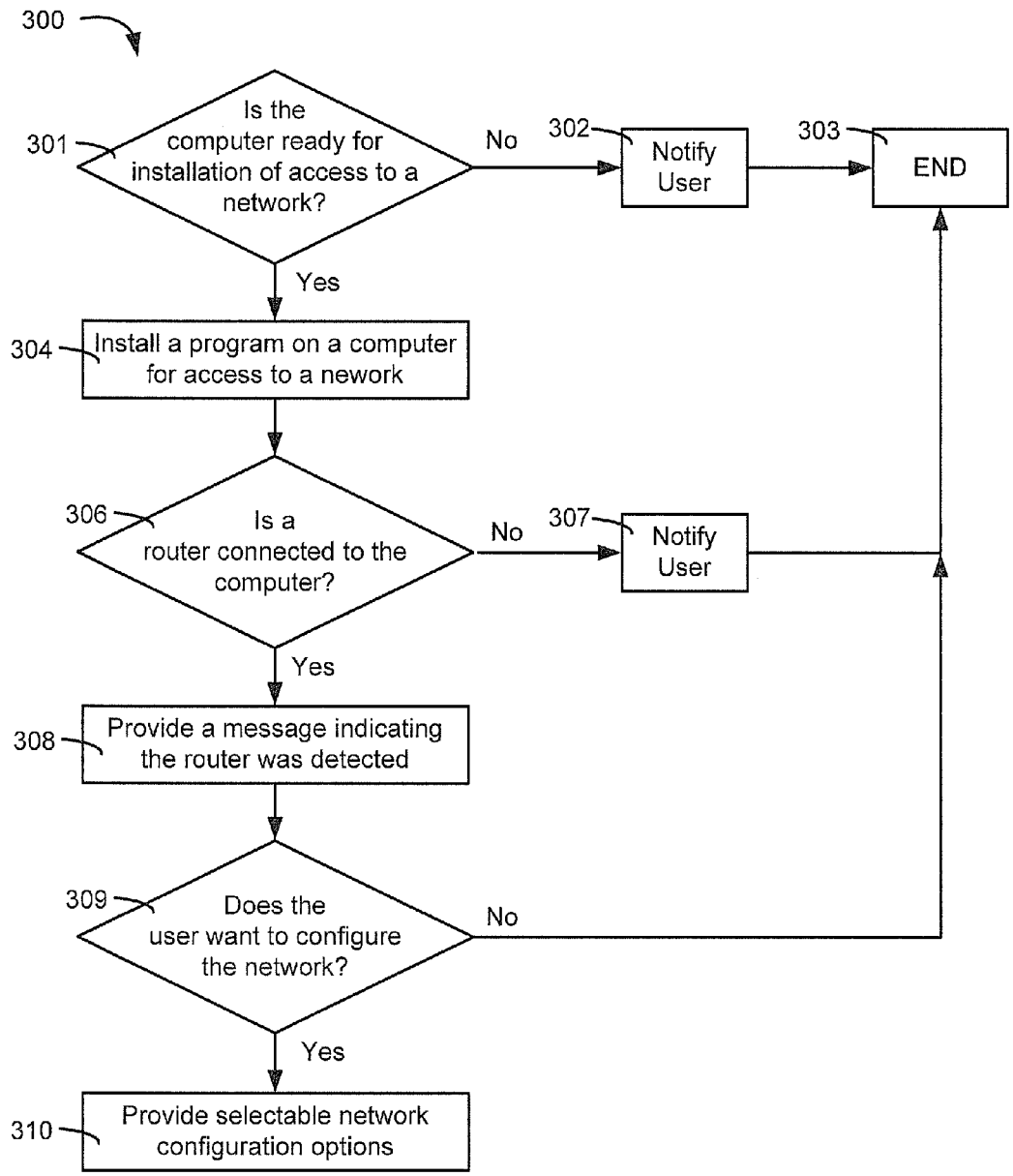
FIG. 3 is a flow chart of a second illustrative embodiment of a method of configuring a network.

Referring to FIG. 3, a flow chart of a second illustrative embodiment of a method of configuring a network is depicted and generally designated 300. The method 300 can be executed via a software module at a computer capable of connecting to the network, such as the computing device 102, the computer 110, the portable computer 114, the handheld device 118, or the wireless device 122 shown in FIG. 1. In a particular embodiment, the method 300 may be implemented as a software module operable to execute during an installation of a service provider installation software.

In a particular embodiment, the method 300 may include verifying if a computer is ready for installation of access to a network, at 301. The verifying may include determining if the computer is connected to a network. In a particular embodiment, the computer may be connected to a network through a wireless connection. When the computer is not ready for installation, the method 300 may provide a message to be displayed to the user that the computer is not ready for installation, at 302, and then end, at 303. When the computer is ready for installation, the method 300 may include installing a program to enable access to the network on the computer, at 304. The program may be a software program provided by a service provider to enable access to a public network, such as the internet, through the service provider.

The method 300 may also include detecting if a router is connected to the computer. When a router is not connected to the computer, the method 300 may provide a message to be displayed to the user that a router was not detected, at 307, and then end, at 303. When a router is connected to the computer, the method 300 may provide a message to be displayed to a user indicating that the router was detected, at 308.

In a particular embodiment, a router may be detected by verifying a connection to the service provider. The connection to the service provider may be verified by multiple techniques. A first technique may include comparing a subnet address of a new IP address to a subnet address of a previously known IP address. This can determine if the network is still connected to the same service provider when the subnet range is from the service provider. A second technique may include using a trace route that shows a list of routers traversed, to allow the user to identify the path taken to reach a particular destination on the network. A third technique may include pinging the service provider by sending a packet to a specified address and waiting for a reply. A fourth technique may include pinging the router by sending a packet to a specified address and waiting for a reply.

The method 300 may then include allowing a user to select if they would like to configure network settings, at 309. When the method 300 receives an indication that the user does not want to configure the network settings, the method 300 may end, at 303. When the method 300 receives an indication that the user does want to configure the network settings, the method 300 may provide selectable network configuration options, at 310.

The selectable network configuration options may include options to configure settings of the router. The selectable network configuration options may also include options to repair any problems with a connection between the router and the service provider. The selectable network configuration options may also include selectable options to implement features such as security, file-sharing, or print sharing. The security features may include encryption, a password protection, a firewall, or any combination thereof.

The user message, the user choices/selectable options, and the selectable network configuration options may be presented to a user via a graphical user interface on a display coupled to the computer. The computer and method 300 may receive an indication of a user input from an input device, such as a mouse, keyboard, or touch screen, to determine a user selection.

Figure 4:
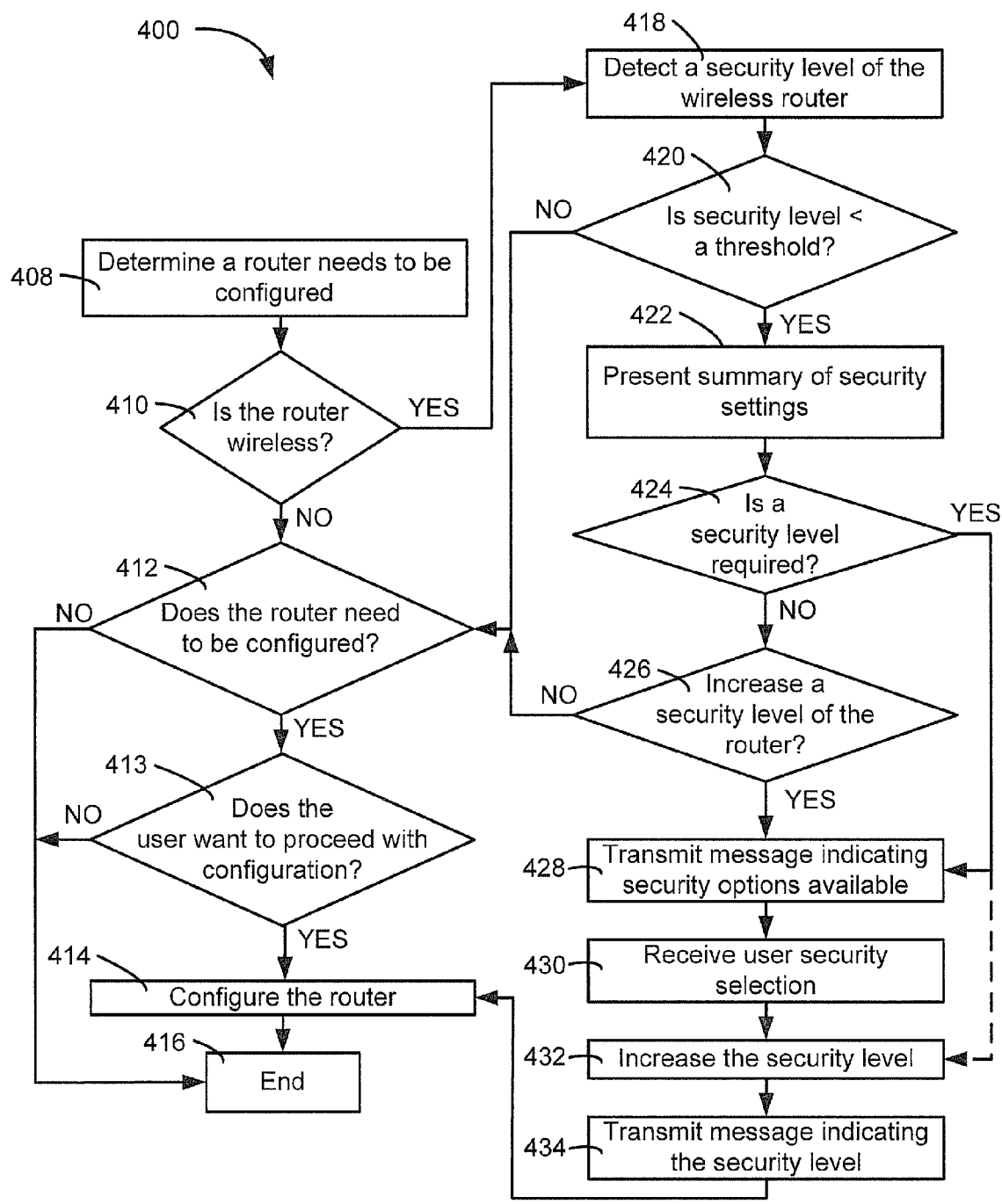
FIG. 4 is a flow chart of a third illustrative embodiment of a method of configuring a network.

Referring to FIG. 4, a flow chart of a third illustrative embodiment of a method of configuring a network is depicted and generally designated 400. The method 400 can be executed via a software module at a computing device capable of connecting to the network, such as the computing device 102, the computer 110, the portable computer 114, the handheld device 118, or the wireless device 122 shown in FIG. 1. In a particular embodiment, the method 400 may be implemented as a software module operable to execute during an installation of a service provider installation software.

The method 400 can include determining that a router, such as the router 106 in FIG. 1, needs to be configured, at 408. In a particular embodiment, the determining may be based on a user selectable network configuration option. In another particular embodiment, the determining may be part of a service provider installation software. In yet another particular embodiment, the determining may be done when a router is added to a network, such as the network shown in FIG. 1. For example, the method 200 or the method 300 may be used to determine if a router needs to be configured.

The method 400 can include determining if the router has a wireless communication capability, at 410. In a particular embodiment, this may be done by comparing a router model number to a known list of router model numbers having a wireless capability. For example, a database listing router model numbers with a wireless communication capability. In another particular embodiment, the method 400 may determine if the router had a wireless communication capability by determining a functionality of the router.

When the router does not have a wireless communication ability, the method 400 may determine if the router needs to be configured, at 412. When the router needs to be configured may be based on current settings of the router, such as security settings, file-sharing settings, print-sharing settings, other configuration options, or any combination of thereof. When the router does not need to be configured, the method may end at 416.

When the router does need to be configured, the method 400 may determine if the user want to proceed with the configuration of the router, at 413. The computer may determine if the user wants to proceed based on an indication of a user input from an input device, such as a mouse, keyboard, or touch screen, to determine a user selection. When the user does not want to configure the router, the method 400 may end at 416. When the user does want to configure the router, the method 400 may configure the router, at 414. The router configuration may include configuring security settings, file-sharing settings, print-sharing settings, a router name, an IP address, other configuration options, or any combination of thereof. Router configuration options may be presented to a user via a graphical user interface on a display coupled to the computer and the computer may receive indications of the user's selection. After the router is configured, the method 400 may end, at 416.

When the router is determined to be a wireless router, at 410, the method 400 may detect a security level of the wireless router, at 418. The security level may be one of multiple available security settings of the wireless router, such as a configuration password, a network access key, or a level of data encryption. Different security levels may be attributed to different types of data encryption. For example, a different security level may be attributed to each of a Wired Equivalent Privacy (WEP) encryption, a Wi-Fi Protected Access security protocol (WPA), a second generation Wi-Fi Protected Access (WPA2), and any other type of encryption.

The method 400 may then include determining if the security level is less than a threshold security level, at 420. The threshold security level may be required by a service provider or other party, such as a software vendor. The threshold security level may be set to check for a minimum required security level. When the security level is greater than or equal to the threshold security level, the method 400 may proceed to determine if the router needs to be configured, at 412.

When the security level is less than the threshold security level, the method 400 may present a summary of the security settings to the user, at 422. The summary may be presented to a user via a graphical user interface at a display coupled to the computer. In a particular embodiment, the method 400 may include determining if a security level is required, at 424.

When a security level is not required, the method 400 may present an option to change the security level of the router, at 426. In a particular embodiment, the option may be to increase the security level to be a higher level of security than previously implemented in the router. When a determination is made not to increase the security level of the router, the method 400 may proceed to determine if the router needs to be configured, at 412. The determination may be made based on an indication of an input from a user.

When a determination is made to increase the security level, the method 400 may include transmitting a message indicating security options that are available, at 428. The message may be provided to the user via a graphical user interface at a display coupled to the computer. The method 400 may also include receiving a user input based on a selection of a security level, at 430.

The method 400 may include increasing the security level of the router, at 432. In a particular embodiment, the security level may be increased based on the user selection of a security level, at 430. In another particular embodiment, when a security level is required, at 424, the method 400 may automatically, without receiving a user input, increase the security level, at 432. The security level may be increased to be equal to or greater than a minimum required security level. In yet another particular embodiment, when a security level is required, at 424, the method 400 may proceed to transmit a message indicating security options that are available, at 428. The message may indicate that the detected security level is below the threshold and must be increased to permit access to the network. The method 400 may also transmit a message to a network provider indicating that the security level is below the threshold. The minimum required security may be required by a service provider when a user enables a wireless network.

After the security level has been increased, the method 400 may transmit a message to be displayed to the user indicating the implemented security level, at 434. In a particular embodiment, the method 400 may transmit a message to a network provider indicating that the security level is equal to or greater than the threshold. The method 400 may then proceed to configure other router settings, at 414.

In accordance with various embodiments of the present disclosure, the methods described herein may be implemented by software programs executable by a computer system. Further, the present disclosure contemplates a computer-readable medium that includes instructions to perform the methods described herein.

The term "computer-readable medium" includes a single non-transitory medium or multiple non-transitory media, such as a centralized or distributed database, and/or associated caches and servers that store one or more sets of instructions. The term "computer-readable medium" shall also include any non-transitory medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magnetic, magneto-optical, or optical medium, such as a disc drive or tapes or other storage device. Accordingly, the disclosure is considered to include any one or more of a computer-readable non-transitory medium and other equivalents and successor non-transitory media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A non-transitory computer-readable storage medium storing instructions that, when executed by a processor, cause the processor to:
   detect, during installation of a software program on a computing device, a router coupled to the computing device, wherein the software program is executable by the computing device to initiate a connection to a network provided by an internet service provider via the router based on a security level of the router;
   receive security settings of the router including a router configuration password, a network access key, and a level of data encryption of the router;
   detect whether the security level of the router satisfies a threshold security level specified by the internet service provider based on the security settings of the router;
   in response to the security level of the router not satisfying the threshold security level, modify the security level of the router to satisfy the threshold security level;
   monitor one or more properties of the connection; and
   in response to detection of a change in the one or more properties, determine whether the router is connected to a different service provider than the service provider.

2. The non-transitory computer-readable storage medium of claim 1, further comprising instructions that, when executed by the processor, cause the processor to transmit a message indicating the security level of the router to the service provider of the network.

3. The non-transitory computer-readable storage medium of claim 2, further comprising instructions, that, when executed by the processor, cause the processor to provide an indication that the connection to the network is disabled when the security level of the router does not satisfy the threshold security level.

4. The non-transitory computer-readable storage medium of claim 3, further comprising instructions, that, when executed by the processor, cause the processor to enable the connection to the network in response to determining that the security level of the router has been modified to satisfy the threshold security level.

5. The non-transitory computer-readable storage medium of claim 1, wherein the one or more properties include an internet protocol (IP) address, a subnet address, a connection to a public network, a connection to a network of a service provider, or any combination thereof.

6. The non-transitory computer-readable storage medium of claim 1, further comprising instructions, that, when executed by the processor, cause the processor to receive settings of the router.

7. The non-transitory computer-readable storage medium of claim 6, wherein the settings of the router include a password, a network access key, a level of encryption, a firewall parameter, or any combination thereof.

8. The non-transitory computer-readable storage medium of claim 6, wherein the settings of the router include a file-sharing setting, a print-sharing setting, or any combination thereof.

9. A method comprising:
   detecting, at a processor during installation of a software program on a computing device, a router coupled to the computing device, wherein the software program is executable by a processor to selectively initiate a connection to a network provided by an internet service provider via the router based on a security level of the router;
   receiving security settings of the router including a router configuration password, a network access key, and a level of data encryption of the router;
   detecting whether the security level of the router satisfies a threshold security level specified by the internet service provider based on the security settings of the router;
   in response to the security level of the router not satisfying the threshold security level, modifying the security level of the router to satisfy the threshold security level;
   monitoring one or more properties of the connection;
   in response to detection of a change in the one or more properties, determining whether the router is connected to a different service provider than the service provider; and
   in response to determining that the router is connected to the different service provider, notifying a user.

10. The method of claim 9, further comprising transmitting a message indicating the security level of the router to the service provider of the network.

11. The method of claim 10, further comprising providing an indication that the security level of the router is below the threshold security level and that the security level is to be increased to permit access to the network.

12. The method of claim 11, further comprising initiating the connection to the network in response to modifying the security level of the router to satisfy the threshold security level.

13. A system comprising:
   a transceiver;
   a processor coupled to the transceiver; and
   a memory accessible to the processor, the memory including instructions executable by the processor to:
      detect, during installation of a software program on a computing device, a router coupled to the computing device, wherein the software program is configured for execution by the processor to selectively initiate a connection to a network provided by an internet service provider via the router based on a security level of the router;

receive security settings of the router including a router configuration password, a network access key, and a level of data encryption of the router;

detect whether the security level of the router satisfies a threshold security level specified by the internet service provider based on the security settings of the router;

in response to the security level of the router not satisfying the threshold security level, modify the security level of the router to satisfy a threshold security level specified by the internet service provider; and in response to a change in the security level of the router, send a router security setting configuration option to a user based on a security capability of the router, wherein the change in the security level of the router indicates that an internet protocol (IP) address of the router has switched from a public IP address to a private IP address.

14. The system of claim 13, wherein the instructions executable by the processor to modify the security level of the router to satisfy the threshold are further executable by the processor to configure a firewall, wherein the security level of the router is determined based at least in part on a configuration of the firewall.

15. The system of claim 14, wherein the firewall is a stateful packet inspection (SPI) firewall.

16. The system of claim 13, further comprising instructions executable by the processor to:

provide an indication that the connection to the network is disabled based on the security level of the router not satisfying the threshold security level;

enable the connection to the network in response to determination that the security level of the router has been modified to satisfy the threshold security level; and monitor the connection for changes to the security level of the router.

17. The system of claim 16, further comprising instructions executable by the processor to, in response to a change in the security level of the router, verify the connection to the network, wherein the connection to the network is verified based on a result of a trace route, a response received after sending a packet to a specified address, a result of a ping of the router, or any combination thereof.

18. The system of claim 16, further comprising instructions executable by the processor to, in response to a change in the security level of the router, verify the connection to the network based on an identification of a service provider associated with the network, wherein the service provider is identified based on a comparison of a subnet address associated with a first IP address to a subnet address associated with a second IP address.

19. The non-transitory computer-readable storage medium of claim 1, wherein determining whether the router is connected to the different service provider is based on a comparison of a first subnet address associated with the service provider to a second subnet address of a detected IP address.

20. The non-transitory computer-readable storage medium of claim 1, wherein determining whether the router is connected to the different service provider is based on a result of a trace route.

* * * * *